United States Patent [19]

Schütz et al.

[11] Patent Number: 5,415,610
[45] Date of Patent: May 16, 1995

[54] FRAME FOR MACHINE TOOLS

[75] Inventors: Willi Schütz, Weiden; Günther Buggle, Villingen-Schwenningen, both of Germany

[73] Assignee: Bernhard Steinel Werkzeugmaschinenfabrik GmbH U. Co., Villingen-Schwenningen, Germany

[21] Appl. No.: 117,508

[22] Filed: Sep. 7, 1993

[30] Foreign Application Priority Data

Sep. 14, 1992 [DE] Germany .................. 42 30 502.0

[51] Int. Cl.⁶ .................. B23Q 1/02; B28B 23/00; B23B 17/00
[52] U.S. Cl. .................. 483/16; 82/149; 408/234; 409/235; 409/286
[58] Field of Search .................. 483/16, 69; 409/235, 409/286, 337; 408/234; 82/149, 148, 147; 248/679

[56] References Cited

U.S. PATENT DOCUMENTS

| | | | |
|---|---|---|---|
| 3,800,636 | 4/1974 | Zagar | 29/452 X |
| 4,040,316 | 8/1977 | Gramespacher | 408/234 |
| 4,478,117 | 10/1984 | Brown et al. | 82/149 |
| 4,622,194 | 11/1986 | Rogers et al. | 409/235 X |
| 4,826,127 | 5/1989 | Koblischek et al. | 248/679 |
| 4,907,478 | 3/1990 | Brown et al. | 82/149 |
| 5,152,645 | 10/1992 | Corsi | 409/235 |
| 5,183,374 | 2/1993 | Line | 409/235 X |

FOREIGN PATENT DOCUMENTS

| | | |
|---|---|---|
| 0527867 | 7/1931 | Germany . |
| 2461948 | 7/1976 | Germany . |
| 333467 | 7/1984 | Germany . |
| 3742042 | 6/1989 | Germany .................. 82/149 |

OTHER PUBLICATIONS

D. Kemmerle, "Use Optimized Construction Opens New Possibilities for Poured Concrete" in Werkstatt und Betrieb vol. 123, No. 4, Apr. 1990.

*Primary Examiner*—William Briggs
*Attorney, Agent, or Firm*—Dominik, Stein, Saccocio, Reese, Colitz, & Van Der Wall

[57] ABSTRACT

In a frame with a horizontal bed (10) and a vertical upright (12) there is for bracing and stiffening a vertical rigid wall (14) rigidly with the bed (10) and the upright (12) connected. The bed (10), the upright (12) and the wall (14) are cast as a single piece of a polymerizable resin-concrete. The wall (14) provides the frame with a high bend and torsional stiffness at a low weight. The wall (14) additionally serves to receive guides and bearing arrangements for functional elements of the machine tool, which by this means can be disposed spatially one above the other.

8 Claims, 5 Drawing Sheets

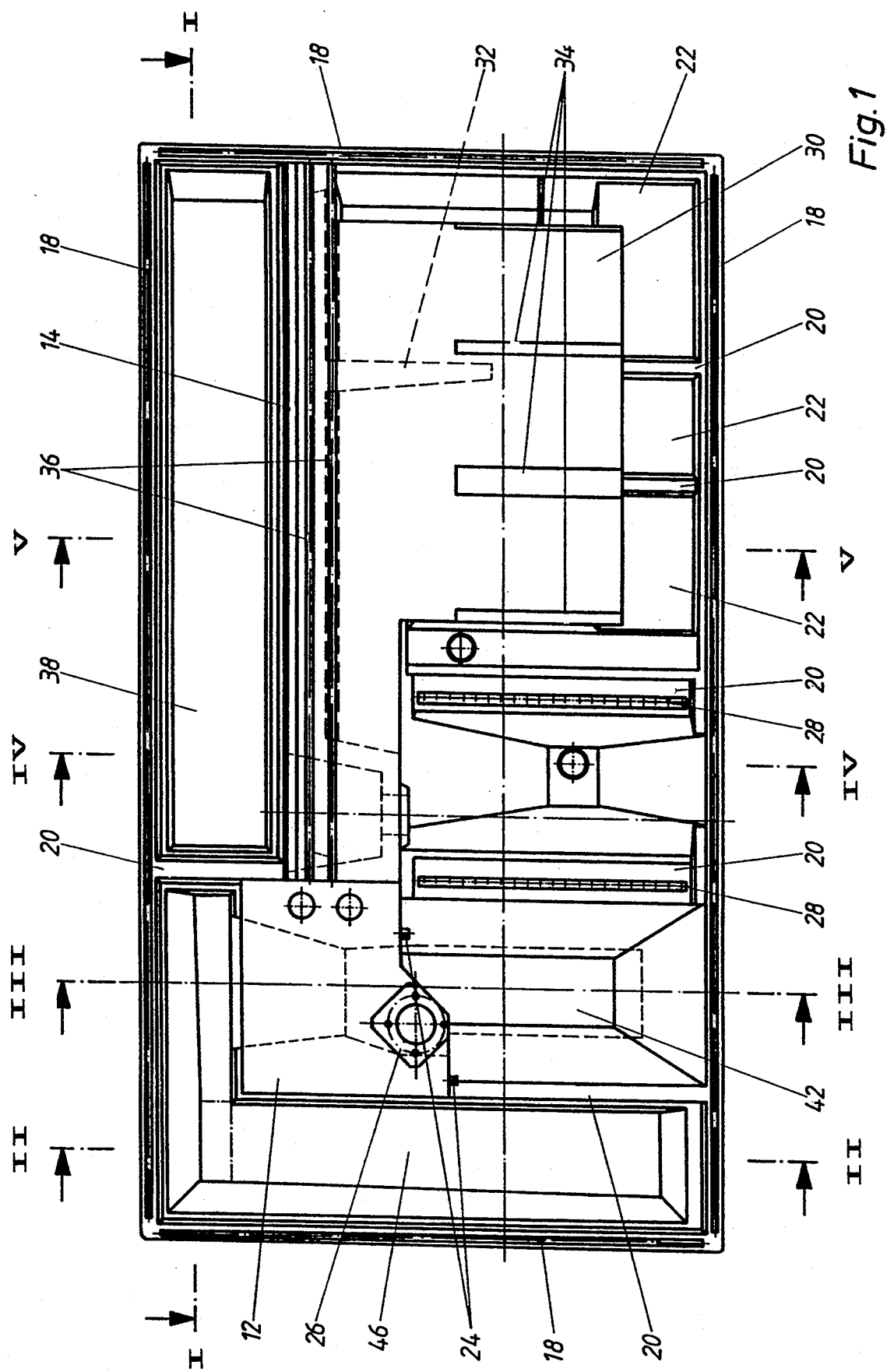

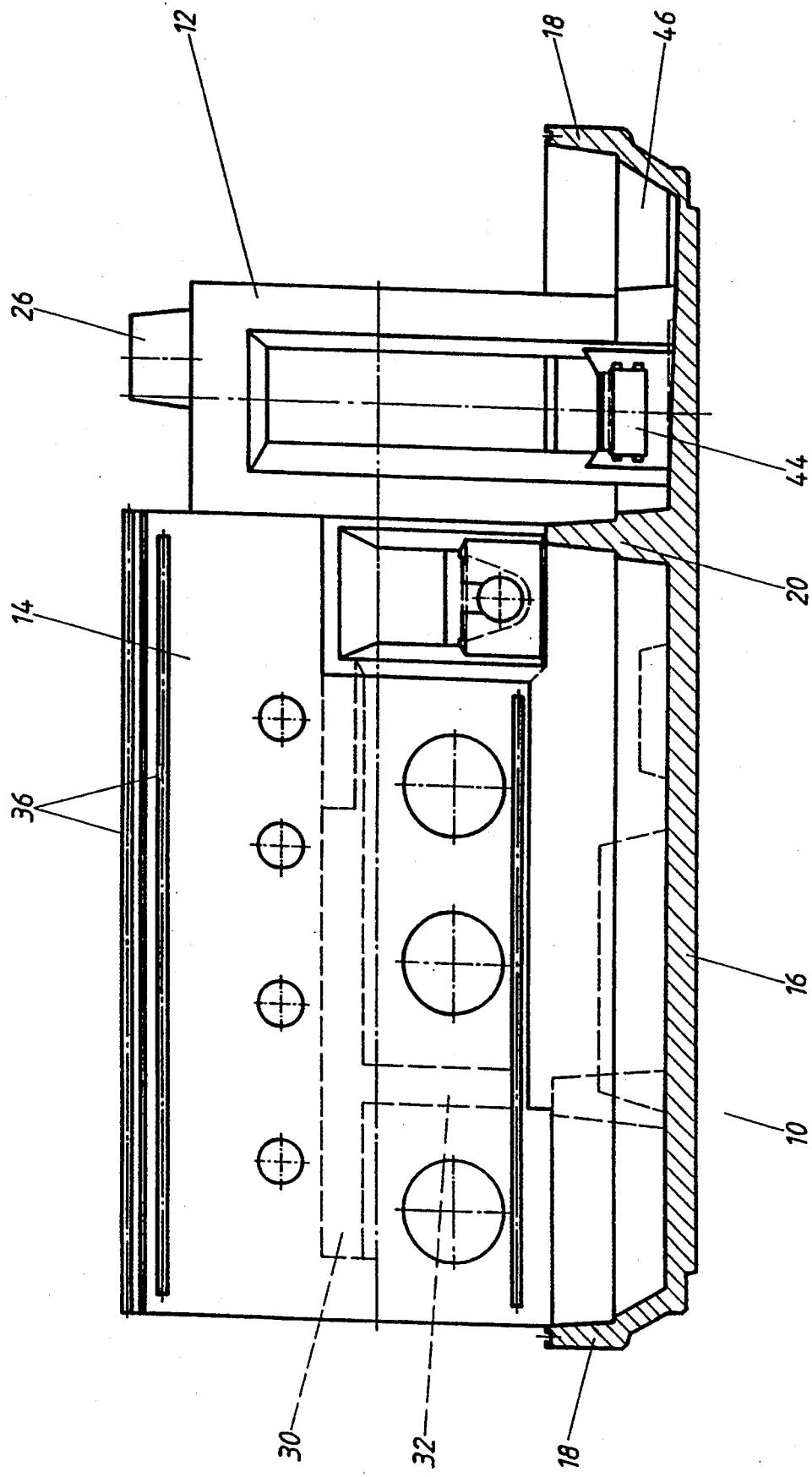

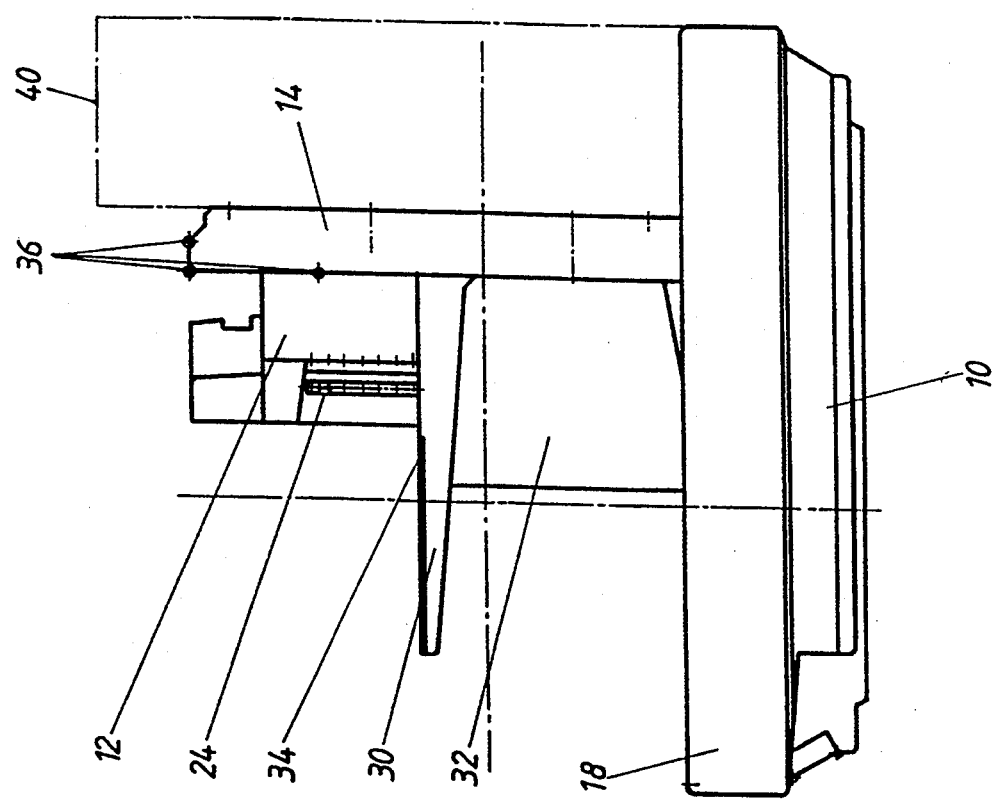
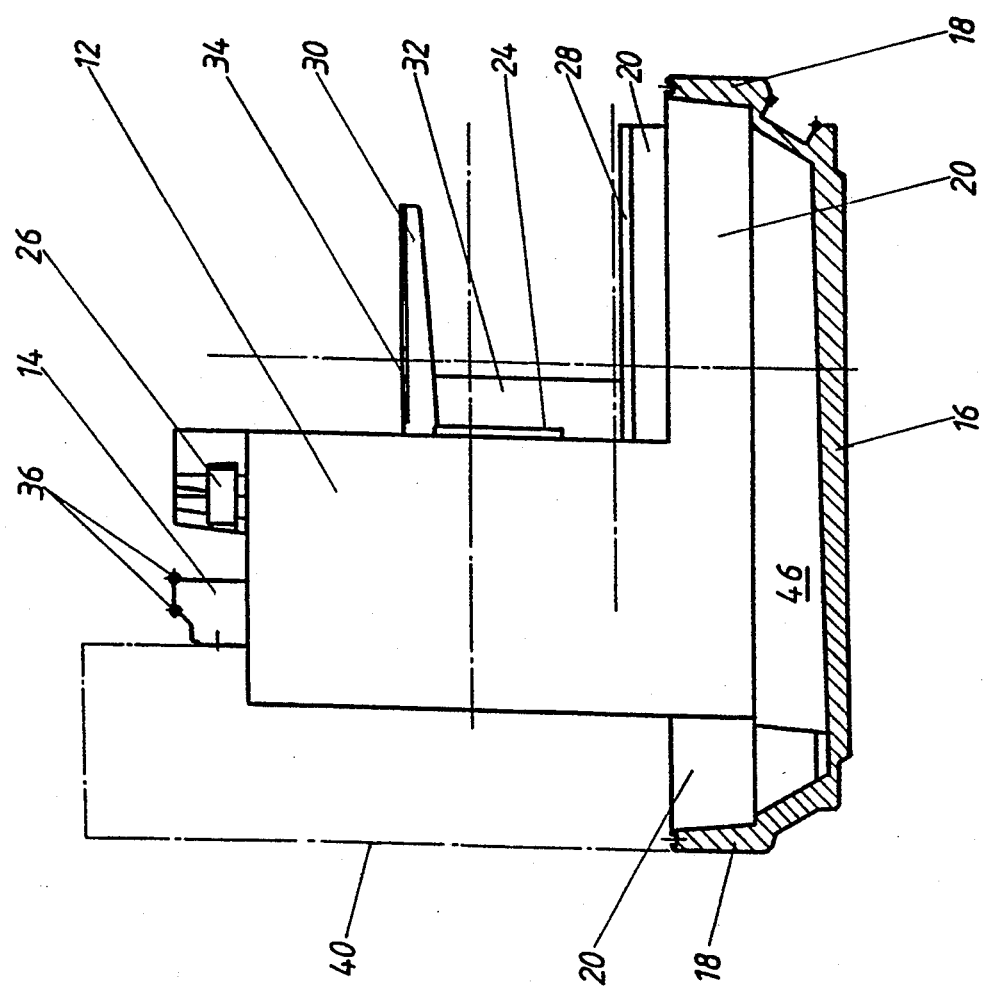

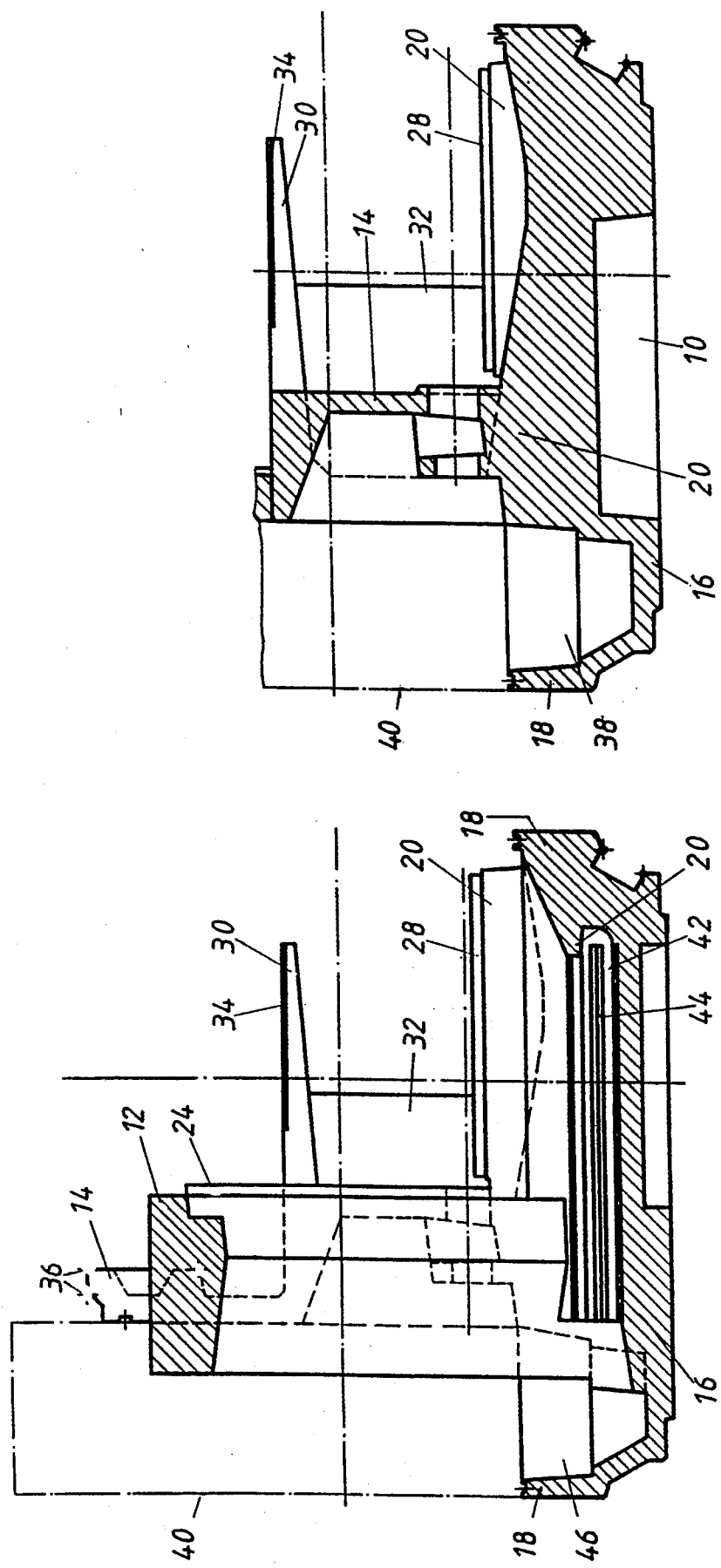

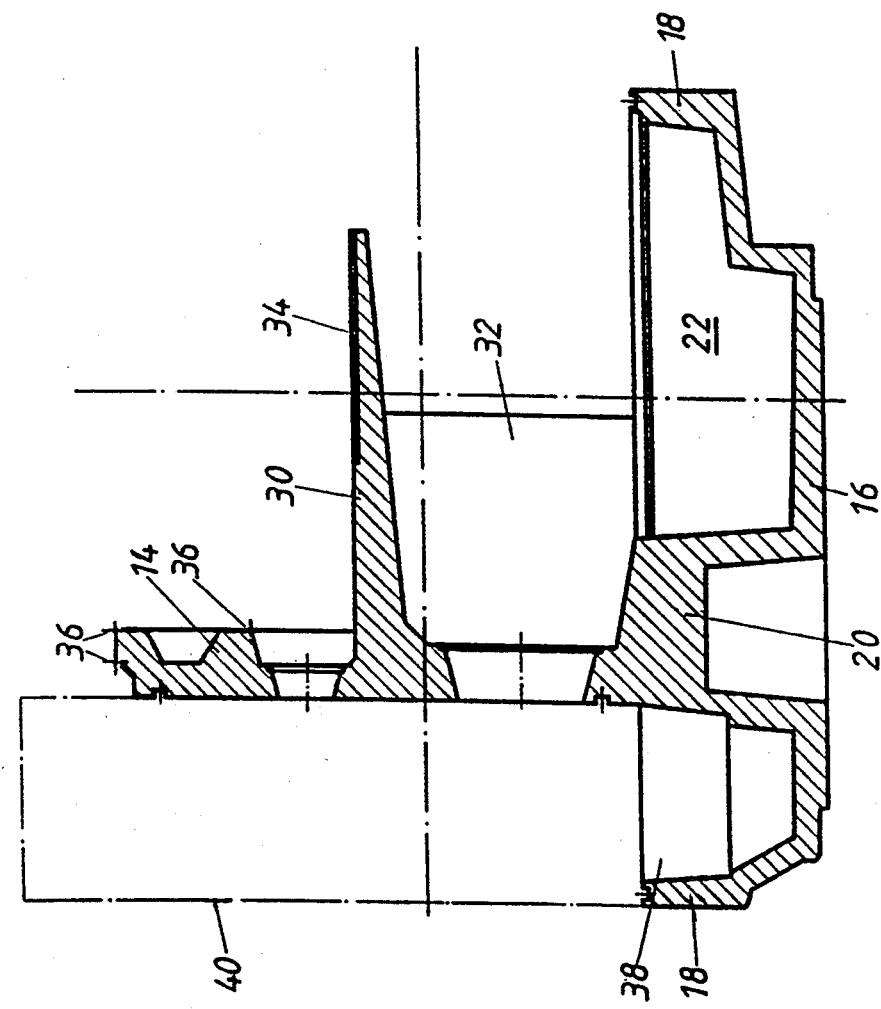

FRAME FOR MACHINE TOOLS

FIELD OF THE INVENTION

The invention concerns a frame for machine tools of the type comprising a horizontal bed and at least one vertical upright. In the present invention there is provided a rigid wall rigidly connected with the bed and the upright for bracing and stiffening. The bed, the upright and the wall are preferably cast as a single piece, preferably of a polymerizable resin-concrete.

BACKGROUND OF THE INVENTION

A large class of machine tools are disposed on a frame which includes a horizontal bed and at least one vertical upright which is mounted on the bed. Depending on the particular construction of the machine tools there are provided on the vertical uprights and on the bed clamping means, and drive means for workpiece and tools, and these are disposed in operable association over three or more axis.

It is known to produce the frame from cast iron or cast steel. The production of these frames is inefficient, since after the casting a further operation such as milling or grinding is necessary. In particular because of this secondary operation it becomes impossible, as a rule, to cast frames for large machine tools in a single casting. A further substantial assembly operation expense is therefor necessary in order to join together these individual pieces.

It is further known to produce a frame of sintered steel. Here also substantial production and assembly expenditures are necessary.

Finally, it is known (for example, see EP 0 046 272 A2), to cast the frame in a single piece using a castable concrete comprising mineral particles bound by a setting polymer resin. This method of manufacture is economical. These frames are characterized by a substantially higher vibration dampening characteristic as compared with the above-mentioned frames constructed of cast iron, cast steel and sintered steel.

It is a common feature of all these known frames, that the uprights which are mounted on the frame project tower-like clear from the bed. Higher loads, inaccuracies in the calibrated assembly of the bed, temperature fluctuations and temperature gradients can therefor result in bending and torsional movement of the upright with respect to the bed. Such movements directly compromise the targeted machine tool precision. In order to improve the precision and minimize the deformation movement of the stand and the bed, the dimensions and the cross-sections of the frame are enlarged. A small improvement in precision is attained at the expense of a substantial increase in the weight and in the material cost of the frame.

The present invention is concerned with the problem of providing a frame for machine tools, which with less expenditure makes possible a higher degree of mechanical precision of the machine tools.

SUMMARY OF THE INVENTION

This problem is solved in accordance with the invention by providing, in a frame for machine tools of the type comprising a horizontal bed and at least one vertical upright, a rigid wall rigidly connected with the bed and the upright for bracing and stiffening. The bed, the upright and the wall are preferably cast as a single piece, preferably of a polymerizable resin-concrete.

Preferred embodiments of the invention are set forth in the dependent claims.

In the frame according to the invention, there is provided, in addition to the horizontal bed and the vertical upright, a vertical rigid wall, which is rigidly fastened on the one hand with the bed and on the other hand with the upright. This wall brings about a form stable bracing of upright and bed, which stiffens the frame against bending and torsion. The bracing by means of the wall makes the frame into a unit having form stability against bending and twisting. Inaccuracies in the alignment during the assembly of the frame have practically no consequence on the precision of the respective positioning of the bed and upright. Fluctuations in the room temperature and in particular temperature gradients in the vicinity of the frame have less of an effect on the form stability of the frame. The frame can, in addition, accept higher loads, which is particularly desirable when it is desired to machine heavier workpieces and when desired to use higher working pressures, higher power, etc. As a result of the bracing by the wall, the material cross sections of the frame can be further reduced, which further saves on costs and weight. By means of the reduced weight and using a construction of a large surface area bed, larger machine tools can be set up with a smaller surface loading of the floor.

BRIEF DESCRIPTION OF THE DRAWINGS

In the following the invention will be explained in greater detail with the aid of a preferred embodiment which is illustrated in the drawings. There are shown in FIG. 1—a top view of a frame for a machining center in accordance with the present invention, FIG. 2—a vertical section along line I—I of FIG. 1, FIG. 3—a vertical section along line II—II in FIG. 1, FIG. 4—a side view of the machine frame of FIG. 1 from the right, FIG. 5—a vertical section along line III—III in FIG. 1, FIG. 6—a vertical section along line IV—IV in FIG. 1, and FIG. 7—a vertical section along line V—V in FIG. 1.

DETAILED DESCRIPTION OF THE INVENTION

In order to also reduce the assembly costs, the frame consisting of the bed, the uprights, and the wall is preferably cast as a single piece. As the material therefor there is preferably used a polymerizable resin-concrete (polymer-concrete), a castable concrete comprised of mineral particles bound by a setting polymer resin. The casting of the frame can be executed with a sufficiently high precision, so that no expensive followup operation is necessary. In particular, ductwork and canals for the supply lines for the machine tools can be cast directly into the casting. The installation of these supply lines, for example electrical supply lines, control, hydraulic, cooling medium supply and withdrawal lines, turnings or chips removal, etc. can be easily accomplished.

The additional bracing by means of the wall allows, due to improved stability, a lower material cross sections of bed and uprights. This results not only in reduced weight and reduced material costs. There can also be hollowed out, also in the frame, larger hollow spaces, which can be additionally used to advantage. These hollow spaces could, for example, be used as coolant reservoirs with great volume capacity. The greater volume capacity makes possible a more effective cooling, which leads to a higher machining precision.

Besides these advantages, which are directly attributable to the reinforcement and stiffening of the frame, the wall can be used as a mounting member of the frame. The wall can be provided with guideways and carrier elements for a wide range of machine parts and machine tools. This brings with it a substantial savings in construction and assembly expenses.

Above all it becomes possible to provide the wall with those functional elements, which in conventional machine tools must be laterally positioned and assembled on the bed. The machine tool can herewith be erected elevationally, and requires a smaller standing room.

So, for example, the headstock of a machine tool can be provided beside the wall horizontally slidably guided on the bed. Above the space which is necessary for the movement of the headstock there can on the wall, for example on a bracket, a tool storage place be provided. Above the tool storage place there can be provided guideways, in which a handling-element is operably provided, for changing of the tools between the storage place and the working place of the machine tool. The wall which is additionally provided on the frame thus makes possible the provision of headstock, tool module or magazine, and handling equipment in three stages one above the other, whereby an exceptionally compact, space saving construction results.

Finally the unoccupied back surface of the wall can also be used as a mounting surface or casing wall for the necessary supply- and/or control means for the machine tool. Hereby there is achieved a further savings in space requirements and construction expense.

Turning now to the figures, the frame represented in the figures is intended for a machining center, in which the headstock with horizontal main spindle is displaceable along a horizontal plane, while the workpiece is mounted on a vertically displaceable workpiece table with vertical work holding plane. Main spindle and workpiece axis are thereby oriented at right angles to each other along a horizontal axis, so that cooling means and chips can freely fall downwardly.

The frame is comprised basically of a bed 10, a vertical upright 12 standing upon and associated with the bed 10, and a vertical wall 14. The unitary frame is cast as a single piece out of polymerizable resin-concrete.

The bed 10 is in the form of a flat, quadrilateral building stone and is formed of a quadrilateral bedplate 16 (side relationship approximately 2:1) with a circumscribing, upwardly directed rim 18, so that a basin like configuration of the bed 10 results. The inner area of the bed 10 is provided with upright standing crosspieces 20, which are variously arranged to run in part oriented longitudinally and in part oriented transversely along the bed 10 and abut on the rim 18. The crosspieces 20 partition the bed 10 into distinct, basin like receptacle spaces. These crosspieces 20 also serve to brace the bed 10. The bed 10 shows, as a result of the surrounding rim 18 and the crosspieces 20, even with a reduced material cross section and material content, a high stability against bending and twisting.

Near a narrow side of the bed 10 is disposed the vertical upright 12. Set into the upright 12 are vertical guide rails 24, which serve to guide a not shown sled, which carries the workpiece mounting table. Further there is integrated in the upright 12 a receptacle 26 for the not shown workpiece spindle of this sled.

The wall 14 is connected onto a longitudinally of the bed 10 running crosspiece 20. The wall 14 has a quadrilateral form, whereby its height essentially corresponds to the height of the uprights 12. The wall 14 is connected to the uprights 12 along a vertical edge. The wall 14 extends from the upright 12 along the longitudinal direction of the bed 10 up to the narrow edge of the bed 10 remote from the upright 12. In the cross-sectional direction of the bed 10 the wall 14 partitions the surface of the bed in approximately the ratio 1:3.

In the larger surface area section of the bed 10 between the wall 14 and the longitudinally running rim 18 there are provided, adjacent to the uprights 12, two parallel perpendicularly to the wall 14 running crosspieces 20, which on their upper edges carry crossrails 28. On the crossrails 28 there is set a not shown transverse displaceable sled, which parallel to the wall 14 carries longitudinal guiding means for the not shown headstock. The headstock with the horizontal and parallel to the wall 14 situated spindle is thereby in the area next to the wall 14 parallel to the wall (Z-axis) and on the crossrails 28 perpendicularly to the wall (Y-axis) displaceable.

At approximately half the height of the wall 14 projects a horizontal bracket 30 out of the planar surface of the wall 14. The bracket 30 extends in the illustrated embodiment in the from the uprights 12 oppositely facing region of the wall 14 over approximately ⅔ of the length of the wall. The height of the bracket 30 over the upper edge of the bed 10 is so selected, that the headstock in its terminal position can travel on the Z-axis with its rearward part under the bracket 30. The higher built-up front section of the headstock travels at the same time in front of the bracket 30. The bracket 30 is cast as a single piece into the wall 14. In order to provide supplemental support for the projecting bracket 30, there is provided a support 32 behind the area of travel of the headstock between a crosspiece 20 of the bed 10 and the bracket 30. The support 32 is likewise cast integrally with the bed 10, the wall 14 and the bracket 30.

On the bracket 30 there are set perpendicularly to the wall 14 oriented receiving rails 34. The receiving rails 34 are for receiving a not shown tool module.

On the horizontal upper edge of the wall 14 there are provided guideways 36, which extend along the entire length of the wall 14. On the guideways there is displaceably disposed a not shown handling element, with which tools can be exchanged between the on the bracket 30 disposed tool module and the main spindle of the headstock.

On the side of the wall 14 which is opposite the headstock and the bracket 30 there is to be found a free space 38 between the wall 14 and the rim 18. This free space 38 serves to receive supply means and energy providing lines of the machining center. In the free space 38 there are disposed the switch boxes 40 for the energy supply, the controllers, etc., which in the figures are indicated using dashed lines. The wall 14 can thereby simultaneously serve as the back wall of the switch boxes and for the mounting of the supply means.

The wall 14 has through holes for the connection of supply means. Further, there are incorporated in the crosspieces 20 of the bed 10 and in the uprights 12 canals and pipe conduits, through which the supply and control circuits are conducted. Further, the cooling circulation is conducted through such canals.

Below the work space of the machining center, which is defined in the bed 10 by the crossrails 28 and the front side of the upright 12 provided with the vertical guide rails 24, is the receiving groove 42 into which is set a chips exhaust 44. On the free narrow side of the bed 10 there is provided laterally adjacent the work space in the bed 10 a collection basin 46 for the dirty cooling medium. Out of this collection basin 46 the cooling medium is pumped through a filter and into a receiving space 22, which serves as a supply reservoir. From the supply reservoir the cooling medium is routed back to the work area for cooling.

Since the entire frame including bed 10, uprights 12, wall 14, with all described elements is cast as a single piece and in which also the installation canals and circuits are already incorporated, there results a substantial savings in assembly work and time.

Now that the invention has been described, what is claimed is:

1. A frame for a machine tool work station, comprising:
    a horizontal bed;
    at least one vertical upright attached to the bed;
    a head stock movably disposed on said horizontal bed;
    a means on the upright for securing a workpiece;
    a vertical, substantially quadrilateral wall for bracing extending between said at least one upright and said bed, said wall rigidly connected with said at least one upright and with said bed, said wall extending longitudinally from said upright and substantially to a side of the bed away from said upright;
    a mounting unit disposed on said wall, said mounting unit being (a) a guideway adapted for slidably receiving functional elements of the machining work station or (b) a mounting element for receiving functional elements and/or machine elements of the machining station, said mounting unit being disposed above the space necessary for sliding travel of the headstock parallel to said vertical wall;
    wherein said vertical wall, said vertical upright, and said bed are cast as a single piece of a polymerizable resin-concrete comprising mineral particles bound by a setting polymer resin.

2. A frame for a machine tool work station as in claim 1, wherein said mounting element is a bracket.

3. A frame for a machine tool work station as in claim 1, wherein said vertical wall is substantially the same height as said upright.

4. A frame for a machine tool work station as in claim 1, wherein said mounting element comprises at least one bracket which is formed as a unitary structure with the wall and which projects out beyond the plane of the wall.

5. A frame for a machine tool work station as in claim 1, wherein said mounting element is adapted for receiving a machine tool.

6. A frame for a machine tool work station as in claim 1, wherein said vertical wall is constructed as a mounting wall for mounting a supply and/or control means for the machine tool.

7. A frame for a machine tool work station as in claim 1, wherein said mounting unit is a mounting element running longitudinally along the length of the wall, and wherein a guideway is provided above said mounting unit, said guideway for the guidance of a handling-element for changing out of work tools between the mounting element and the spindle of the headstock.

8. A frame for a machine tool work station as in claim 1, wherein said wall is provided with guideways, upon which functional elements of the machine tool are displaceably guided.

* * * * *